United States Patent [19]

Hill et al.

[11] Patent Number: 5,693,378
[45] Date of Patent: Dec. 2, 1997

[54] PROCESS FOR PREPARING REINFORCING FIBER PELLETS

[75] Inventors: Homer G. Hill, Newark; Leonard J. Adzima, Pickerington; Robert A. Schweizer, Granville, all of Ohio; Denny E. Black, Anderson, S.C.

[73] Assignee: Owens-Corning Fiberglas Technology, Inc., Summit, Ill.

[21] Appl. No.: 811,559

[22] Filed: Mar. 4, 1997

Related U.S. Application Data

[60] Continuation of Ser. No. 701,095, Aug. 21, 1996, which is a division of Ser. No. 485,747, Jun. 7, 1995, Pat. No. 5,578,535.

[51] Int. Cl.$^6$ ................................................. B05B 1/20
[52] U.S. Cl. ........................ 427/601; 106/600; 106/604; 427/221; 427/299; 427/346; 427/389.7; 427/443.2; 501/35
[58] Field of Search .................................. 106/600, 604; 501/35; 427/601, 215, 299, 346, 372.2, 443.2, 221, 389.7

[56] References Cited

U.S. PATENT DOCUMENTS

| | | | |
|---|---|---|---|
| 2,914,835 | 12/1959 | Slayter et al. | 28/72 |
| 3,498,802 | 3/1970 | Bickford et al. | 106/39 |
| 3,498,803 | 3/1970 | Stookey | 106/39 |
| 3,912,481 | 10/1975 | Bartholomew et al. | 65/30 |
| 3,915,720 | 10/1975 | Tarcza | 106/39.6 |
| 3,940,277 | 2/1976 | Pierson et al. | 106/39.6 |
| 3,948,629 | 4/1976 | Bartholomew et al. | 65/30 R |
| 3,969,100 | 7/1976 | Kuna et al. | 65/27 |
| 4,059,425 | 11/1977 | Brydges et al. | 65/22 |
| 4,201,561 | 5/1980 | Pierson et al. | 65/30 R |
| 4,329,163 | 5/1982 | Russell | 65/2 |
| 4,446,207 | 5/1984 | Dewitte et al. | 428/402 |
| 4,840,755 | 6/1989 | Nakazawa et al. | 264/15 |

OTHER PUBLICATIONS

Derwent Abstract, JP 53-130328, Nov. 14, 1978.

*Primary Examiner*—Bernard Pianalto

[57] ABSTRACT

A reinforcing composition is provided comprising pellets produced by the process of hydrating glass fibers to achieve a water content on the glass fibers of from about 11 weight percent to about 20 weight percent, mixing the glass fibers for at least about three minutes, thereby forming pellets, and drying.

20 Claims, No Drawings

PROCESS FOR PREPARING REINFORCING FIBER PELLETS

CROSS REFERENCE TO RELATED APPLICATIONS

This is continuation of U.S. patent application Ser. No. 08/701,095 filed Aug. 21, 1996, which is a divisional of U.S. patent application Ser. No. 08/485,747 filed Jun. 7, 1995, now U.S. Pat. No. 5,578,535.

BACKGROUND OF THE INVENTION

The present invention relates generally to a novel glass composition and, more particularly, to pellets produced from glass fibers by mixing hydrated glass fibers to form pellets, and drying.

Chopped glass strands are commonly used as reinforcement material for thermoplastic articles. Glass strands of particular lengths and diameters are added to thermoplastic resins to form such composite articles as automotive distributer caps, power hand tool housings, fan shroud, and chain saw housings.

Since glass strands are used as a reinforcement material, larger, denser glass materials are constantly being sought. One variation involves compacting the glass strands. Compacted chopped glass strands have previously been used as thermoplastic reinforcement material. The prior art discloses a method for producing compacted glass strands by wetting chopped glass strands and vibrating them. However, this method is slow and produces a fiber rod which is consolidated from one chopped strand. Therefore, the diameter of the glass fiber rod of the prior art is not significantly greater than an individual chopped strand.

Therefore, a need still exists for an improved thermoplastic reinforcing glass product which is significantly denser and larger in diameter than an individual chopped strand and which can be produced efficiently.

SUMMARY OF THE INVENTION

This need is met by the present invention, whereby an improved glass fiber product is provided which demonstrates increased density and a larger diameter than an individual chopped strand.

In accordance with a first aspect of the present invention, a reinforcing composition is provided. The reinforcing composition comprises pellets produced by the process of hydrating glass fibers to achieve a water content on the glass fibers of from about 11 weight percent to about 20 weight percent, mixing the glass fibers for at least about three minutes, thereby forming pellets, and drying. Preferably, the glass fibers are mixed for a period of time from about 3 minutes to about 15 minutes. More preferably, the glass fibers are mixed for a period of time from about 5 minutes to about 10 minutes. Most preferably, the glass fibers are mixed for a period of time from about 8 minutes to about 9 minutes.

Also, the water content of the glass fibers is preferably from about 12 weight percent to about 18 weight percent. More preferably, the water content of the glass fibers is from about 14 weight percent to about 15 weight percent.

Preferably, the glass fibers are of a length between $\frac{1}{16}$ inch and $\frac{1}{2}$ inch. More preferably, the glass fibers are of a length between $\frac{1}{8}$ inch and $\frac{1}{4}$ inch. Most preferably, the glass fibers are of a length between $\frac{5}{32}$ inch and $\frac{3}{16}$ inch.

In addition, the pellets are preferably dried at a temperature of from about 150° C. to about 315° C. More preferably, the pellets are dried at a temperature of from about 200° C. to about 250° C.

Also, two or more different diameters of the glass fibers may be used.

In accordance with a second aspect of the present invention, a process for producing a novel glass fiber composition is provided. The process comprises the steps of: hydrating glass fibers by coating the glass fibers with sufficient water to achieve a water content on the glass fibers of from about 11 weight percent to about 20 weight percent, mixing the glass fibers for at least about three minutes, thereby forming pellets, and drying. Preferably, the glass fibers are mixed for a period of time from about 3 minutes to about 15 minutes. More preferably, the glass fibers are mixed for a period of time from about 5 minutes to about 10 minutes. Most preferably, the glass fibers are mixed for a period of time from about 8 minutes to about 9 minutes.

Also, the water content of the glass fibers is preferably from about 12 weight percent to about 18 weight percent. More preferably, the water content of the glass fibers is from about 14 weight percent to about 15 weight percent.

Preferably, the glass fibers are of a length between $\frac{1}{16}$ inch and $\frac{1}{2}$ inch. More preferably, the glass fibers are of a length between $\frac{1}{8}$ inch and $\frac{1}{4}$ inch. Most preferably, the glass fibers are of a length between $\frac{5}{32}$ inch and $\frac{3}{16}$ inch.

In addition, the pellets are preferably dried at a temperature of from about 150° C. to about 315° C. More preferably, the pellets are dried at a temperature of from about 200° C. to about 250° C.

Also, two or more different diameters of the glass fibers may be used.

DETAILED DESCRIPTION OF THE INVENTION

An improved glass composition for reinforcing thermoplastic materials is provided. The glass composition does not resemble typical chopped glass strand. The glass fiber composition of the present invention, which is identified as a reinforcing fiber pellet (RFP), is a compact pellet-shaped material composed of a layering of many glass fibers.

RFPs are composed of glass fibers. These fibers may be selected from a wide variety of diameters and lengths. Preferably, the glass fibers have a diameter in the range of from about 8.5 microns to about 100 microns. More preferably, the glass fibers have a diameter in the range of from about 8.5 to about 34 microns. Also, fibers of more than one diameter may be used.

The glass fibers are preferably chopped strands. These chopped strands are preferably of a length between $\frac{1}{16}$ inch and $\frac{1}{2}$ inch. More preferably, they are of a length between $\frac{1}{8}$ inch and $\frac{1}{4}$ inch. Most preferably, the chopped strands are about $\frac{5}{32}$ inch in length.

The glass fibers are hydrated and mixed for a sufficient period of time to produce pellets. The hydration of the fibers should be sufficient to prevent filamentization of the fibers. Also, the fibers should not be excessively hydrated or the fibers will agglomerate into a useless clump. Preferably, the water content of the hydrated glass fibers is from about 11 weight percent to about 20 weight percent. More preferably, the water content of the hydrated glass fibers is from about 12 weight percent to about 18 weight percent. Most preferably, the water content of the hydrated glass fibers is from about 14 weight percent to about 15 weight percent. The hydration solution may be water alone or may be water in combination with other compositions such as coupling agents, film formers, wetting agents, thickeners, binders, lubricants, and anti-static agents.

The hydrated glass fibers are preferably mixed for a period of time from about 3 minutes to about 15 minutes. More preferably, the glass fibers are mixed for a period of time from about 5 minutes to about 10 minutes. Most preferably, the glass fibers are mixed for a period of time from about 8 minutes to about 9 minutes. The term "mixing" is used in the present invention to describe any process which will keep fibers moving over and around one another. Such processes may also be described as tumbling, agitating, blending, commingling, stirring, and intermingling.

The glass fibers may be hydrated and mixed in a variety of methods. One method involves placing glass fibers in a plastic bag. The bag is flattened and water or an aqueous solution is sprayed directly on the fibers. The bag is then rotated, flattened, and liquid is once again applied. The spraying continues until the desired degree of hydration is reached. The rotating process is complete when glass pellets form in the bag. Other processes can also be used to hydrate and mix the glass fibers. These processes include a modified disk pelletizer, a rotating drum pelletizer, a vibrating bed, a plow mixer, and a ribbon mixer.

Preferably, a commercially available disk pelletizer is modified and used to hydrate and mix the glass fibers. A disk pelletizer operates by rotating a large, dish-shaped disk. The disk is maintained at a 25° to 30° angle. Commercially available disk pelletizers have scraper blades inside the disk which prevent clumps of powder from forming. For use in the present invention, the disk pelletizer is modified by removing the scraper blades from the interior of the disk and coating the interior of the disk with a non-wetting coating such as Teflon™. The scraper blades are removed to allow the glass fibers to freely mix. The non-wetting coating is applied to prevent build-up of glass fibers on the interior surface of the disk.

In the present invention, chopped glass strands are introduced into the bottom of the modified disk. The glass strands are treated with an aqueous solution as they rotate in the disk. Finally, the hydrated, pelletized glass fibers are removed from the pelletizer by passing over the front lip of the disk. A continuous process is achieved as pellets fall from the disk as fiber is continuously introduced into the bottom of the modified disk.

The pelletized glass fibers are dried to form the glass fiber pellets of the present invention. Preferably, the glass fibers are dried at a temperature of from about 150° C. to about 315° C. More preferably, a temperature of from about 185° C. to about 300° C. is used. Most preferably, a temperature of from about 200° C. to about 250° C. is used.

Drying can be accomplished in a variety of manners. A preferred method uses a fluidized bed oven known as a Jeffrey oven. A Jeffrey oven is a commercially available drying device. However, other processes such as a heat tower, a cookie sheet used in a convection or microwave oven, and others may be used.

The resulting glass fiber product is a compact pellet-shaped material composed of a layering of many glass fibers. The glass fiber pellet produced by the present invention is about 20 to 30 percent denser than an individual glass strand. Also, the glass fiber pellet produced by the present invention is about five to fifteen times larger in diameter than an individual glass strand. The glass fiber pellets are useful as a reinforcing material for thermoplastics and other materials. Also, the glass fiber pellets of the present invention may be used in other capacities that would be apparent to one skilled in the art.

The following example is given to illustrate certain preferred details of the invention, it being understood that the details of the example are not to be taken as in any way limiting the invention thereto.

EXAMPLE 3400 grams of wet glass fiber is placed in a 24 inch by 42 inch polyurethane bag. The glass fiber is wet due to forming moisture acquired during manufacture of the glass fibers. The fibers are spread out in a flat, thin layer with the bag flat on the table. A solution containing 958.5 grams of water and 41.5 grams of TGIC (triglycidyl isocyanurate) is placed in a spray bottle and applied to the glass fibers in the following manner: The flat, thin layer of glass is sprayed with solution, the bag is then flipped 180 degrees, flattened, and sprayed again. The bag is then flipped 90 degrees, flattened, and sprayed. The flipping, flattening, and spraying procedure is continued. The bag is alternately flipped 180 degrees and then 90 degrees. When 200 grams of solution have been applied and the measured water content of the fibers is about 15 percent, spraying is stopped. The process is complete when glass pellets form in the bag. The bag is then tied close.

The bagged glass fibers are dried. The bagged glass fibers are slowly hand fed into a Jeffrey oven set at 205° C., screened, and boxed. The resulting glass composition is pellet-shaped. The glass strand pellets are of the same length as the input chopped strands. Also, the pellets do not agglomerate into larger pellets when mixed for a prolonged period of time.

The present invention results in several advantages. RFPs exhibit much better flow and fewer fines than typical chopped strand products. Also, sizings and binders can be applied to the glass pellets outside of the glass forming environment. Therefore, chemistries which are not desirable in the forming process because of toxicity, cleanliness, etc. can be used with this product.

In addition, the pelletizing process of the present invention produces improved glass strand pellets of the same length as the input chopped strands. Furthermore, the pellets do not agglomerate into larger pellets when mixed for a prolonged period of time. This simplifies the process and reduces the chance of non-uniform product.

Having described the invention in detail and by reference to preferred embodiments thereof, it will be apparent that modifications and variations are possible without departing from the scope of the invention defined in the appended claims.

What is claimed:

1. A process for producing a glass fiber composition comprising the steps of: hydrating 1/16 to 1/2 inch long glass fibers by coating said glass fibers with sufficient water to achieve a water content on said glass fibers of from about 11 weight percent to about 20 weight percent, mixing said glass fibers for at least about three minutes, thereby forming pellets, and drying.

2. The process of claim 1 wherein said glass fibers are mixed for a period of time from about 3 minutes to about 15 minutes.

3. The process of claim 2 wherein said glass fibers are mixed for a period of time from about 5 minutes to about 10 minutes.

4. The process of claim 3 wherein said glass fibers are mixed for a period of time from about 8 minutes to about 9 minutes.

5. The process of claim 1 wherein the water content of said glass fibers after hydration is from about 12 weight percent to about 18 weight percent.

6. The process of claim 5 wherein the water content of said glass fibers after hydration is from about 14 weight percent to about 15 weight percent.

7. The process of claim 1 wherein said glass fibers are of a length between ⅛ inch and ¼ inch.

8. The process of claim 1 wherein said glass fibers are dried at a temperature of from about 185° C. to about 300° C.

9. The process of claim 8 wherein said glass fibers are dried at a temperature of from about 200° C. to about 250° C.

10. The process of claim 1 wherein two or more different diameters of said glass fibers are used.

11. A process for producing glass fiber pellets comprising: (i) mixing for a period of time of at least three minutes to form pellets (a) chopped glass fibers each having a length of from about 1/16 inch to about ½ inch and (b) a hydrating solution containing (i) water in amount sufficient to achieve a water content on said glass fibers of from about 11 weight percent to about 20 weight percent, and (ii) at least one member selected from the group consisting of coupling agents, film formers, wetting agents, thickeners, binders, lubricants, and anti-static agents; and (2) drying said pellets.

12. The process of claim 11 wherein said hydration solution further contains triglycidyl isocyanurate.

13. The process of claim 11 wherein said mixing is accomplished using a modified disk pelletizer, a rotating drum pelletizer, a vibrating bed, a plow mixer, or a ribbon mixer.

14. The process of claim 11 wherein said period of time is no more than about 15 minutes.

15. The process of claim 11 wherein said period of time is from about 5 minutes to about 10 minutes.

16. The process of claim 11 wherein said period of time is from about 8 minutes to about 9 minutes.

17. The process of claim 11 wherein said hydration solution consists essentially of water and triglycidyl isocyanurate.

18. The process of claim 13 wherein said drying is conducted at a temperature of about 205° C.

19. The process of claim 13 wherein said water content of said glass fibers after hydration is about 15 weight percent.

20. The process of claim 11 wherein said chopped glass fibers comprise fibers having at least two different diameters.

* * * * *